United States Patent [19]

Tanner

[11] Patent Number: 5,176,464
[45] Date of Patent: Jan. 5, 1993

[54] MECHANICAL COUPLING PARTICULARLY ADAPTED FOR COUPLING A VALVE AND ACTUATOR

[75] Inventor: Douglas J. Tanner, St. Cloud, Minn.

[73] Assignee: General Signal Corporation, Stamford, Conn.

[21] Appl. No.: 699,043

[22] Filed: May 13, 1991

Related U.S. Application Data

[63] Continuation of Ser. No. 546,956, Jul. 2, 1990, abandoned.

[51] Int. Cl.⁵ .............................................. B25G 3/20
[52] U.S. Cl. .................................... 403/370; 403/371; 403/374; 403/344
[58] Field of Search ............... 403/369, 371, 370, 383, 403/361, 358, 368, 374, 314, 297, 409.1, 367, 344; 411/25, 27, 28, 55, 76, 77; 292/355; 279/87, 59, 58

[56] References Cited

U.S. PATENT DOCUMENTS

| 172,689 | 1/1876 | Barrett | 279/59 |
|---|---|---|---|
| 444,579 | 1/1891 | Jackson | 403/314 |
| 1,130,409 | 3/1915 | Kirk | 403/360 |
| 1,501,465 | 7/1924 | Peck | 403/334 X |
| 3,222,884 | 12/1965 | Lyle | 279/87 X |
| 3,501,183 | 3/1970 | Stratienko | 403/409.1 X |
| 3,563,581 | 2/1971 | Sommerstein | 403/314 X |
| 4,555,199 | 11/1985 | Maier et al. | 403/370 |

FOREIGN PATENT DOCUMENTS 879842 12/1942 France ................ 403/297

OTHER PUBLICATIONS

Ringfender Brochure 4 pages, Figures titled "Locking Elements" by Ringfender Corp.

Primary Examiner—Andrew V. Kundrat
Attorney, Agent, or Firm—Raymond E. Smiley; Robert S. Smith

[57] ABSTRACT

Apparatus for mechanical coupling such as an actuator to a valve includes an elongated drive member having an axial extremity having a drive surface and an elongated driven member having an axial extremity having a drive surface. One of the drive surfaces is an internal surface which has a polygon shaped cross section and one of the drive surfaces is an external drive surface which has a polygon shaped cross section. In some embodiments first and second sleeves including a plurality of wedge surfaces having generally planar faces are inserted between the drive and driven surfaces. In other forms of the invention the internal drive surface has four wedge shaped faces and a single sleeve having wedge shaped faces is inserted between the drive and driven member. The drive and driven members are disposed with the drive surfaces disposed in nested axially overlapping relationship with the wedge shaped surfaces disposed radially intermediate the respective drive surfaces. Apparatus is provided to urge the wedge shaped surfaces of the first and second sleeves intermediate the drive surfaces of the drive and driven member.

38 Claims, 4 Drawing Sheets

MECHANICAL COUPLING PARTICULARLY ADAPTED FOR COUPLING A VALVE AND ACTUATOR

RELATED APPLICATIONS

This application is a continuation in part of of U.S. patent application Ser. No. 07/546,956 filed Jul. 2, 1990, now abandoned.

BACKGROUND OF THE INVENTION

The invention relates to a mechanical coupling and particularly to a coupling particularly adapted to couple a valve actuator to a valve. Although the apparatus has particular application to valves it will be understood that the apparatus of the invention may also be used to couple other members.

The prior art includes a wide variety of mechanical couplings. It is an object of the invention to provide apparatus which will permit the connection of a range of valve shaft sizes to an actuator of one particular size. Thus, a valve manufacturer need not inventory, for example four different size valve actuators to fit respectively four different size valve shafts. Instead he may inventory a single actuator and four different valve couplings.

It is an object of the invention to provide a coupling apparatus which enable the quick and easy installation of an actuator on a valve body and particularly with a single bolt.

Another object of the invention is to provide apparatus that couples a drive and a driven member such as an actuator and a valve shaft with an absolute minimum of lost motion so that the driven member, such as the valve, is accurately controlled.

A further object of the invention is to provide embodiments of the invention that have a minimum number of parts.

Still another object of the invention is to provide apparatus which will mount the valve actuator closely to the valve to minimize vibration which may be associated with a relatively heavy actuator which is cantilevered out from the valve body. This will minimize vibrational loads on the duct or pipe to which the valve body is attached.

It is yet another object of the invention to provide apparatus which is may be manufactured at less expense than prior art mechanisms.

SUMMARY OF THE INVENTION

It has now been found that these and other objects of the invention may be attained in an apparatus for mechanical coupling which includes an elongated drive member having an axial extremity having a drive surface and an elongated driven member having an axial extremity having a drive surface, one of the drive surfaces is an internal drive surface which has a polygon shaped cross section and one of the drive surfaces is an external drive surface which has a polygon shaped cross section. The apparatus also includes a first sleeve including at least a first wedge shaped surface having generally planar faces and a thin cross section axial part and a thick cross section axial part. The drive and driven members are disposed with the drive surfaces disposed in nested axially overlapping relationship with the first wedge shaped surface disposed radially intermediate the respective drive surfaces. The apparatus also includes means for urging the first wedge shaped surface of the first sleeve intermediate the drive surfaces of the drive and driven member.

In some forms of the invention a second sleeve includes at least a first wedge shaped surface having generally planar faces and a thin cross section axial part and a thick cross section axial part, the respective first wedge shaped surfaces are disposed in overlapping relationship intermediate the drive surfaces. The apparatus may also include means for urging the first wedge shaped surface of the second sleeve intermediate the drive surfaces of the drive and driven members.

The first and second wedge shaped surfaces may be disposed in opposed relationship so that movement of the wedge shaped surfaces to increase overlapping therebetween caused by the means for urging the first wedge shaped surface of the first sleeve and the means for urging the first wedge shaped surface of the second sleeve cause the wedge shaped surfaces to have progressively greater wedging action.

The first and second sleeves may include a plurality of wedge shaped surfaces each having generally planar faces and a thin cross section axial part and a thick cross section axial part, respective wedge shaped surfaces of the first and second sleeves may be disposed in axially overlapping face to face relationship intermediate the drive surfaces; and means may be provided for urging all of the wedge shaped surfaces of the first and second sleeve members intermediate the drive surfaces of the drive and driven members.

Both of the sleeve members may have the same number of wedge shaped members as the number of sides of the polygon shaped cross section of the external drive surface.

Each of the sleeves may have an axis and a perpendicular to one face of each one of the plurality of wedge shaped members is perpendicular to the axis. See, for example, FIGS. 3 and 5 where it is apparent that the respective sleeves have outer surfaces that are coincident with at least a portion of a square (not shown). Obviously, lines that are perpendicular to each of these "sides" of a square that intersect the axis will be perpendicular to the axis. Each of the sleeves may include four wedge shape members. The external drive surface may have a square cross section. Each of the means for urging may comprise a single bolt for urging the first and second sleeves into engagement. At least one of the sleeves may include a threaded bore for engagement with a bolt to force separation of the first and second sleeves.

In the embodiments coupling a valve and an actuator may comprise an elongated actuator drive member having an axial extremity having an internal drive surface and an elongated valve driven member has an axial extremity having an external drive surface. The actuator may include a rack cooperating with the drive member. In some forms of the invention only a single sleeve may be utilized and either the drive or the driven member may have wedge shaped faces. In still other forms of the invention the either or both the drive or driven member may be tapered and no intermediate sleeve is provided.

BRIEF DESCRIPTION OF THE DRAWING

The invention will be better understood by reference to the accompanying drawing in which.

DESCRIPTION OF THE PREFERRED EMBODIMENTS

Referring now to FIGS. 1-7 there is shown a valve and actuator assembly 10 incorporating a first embodiment of a mechanical coupling assembly 13 in accordance with a preferred form of the invention.

Figure 1:
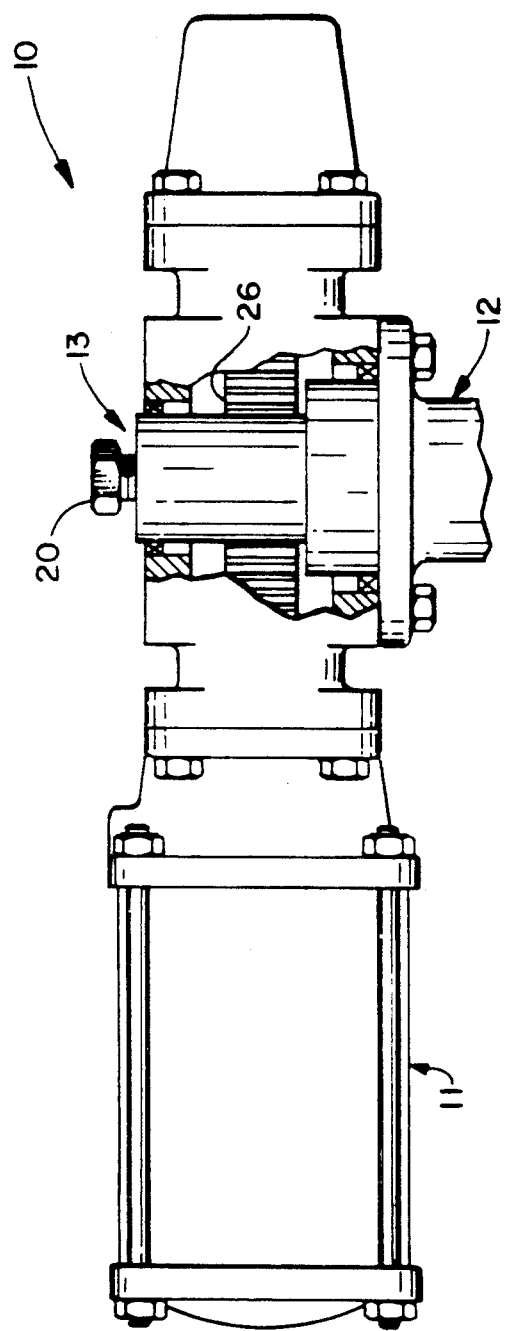
FIG. 1 is a fragmentary front elevational view of a valve and actuator assembly together with a coupling in accordance with one form of the invention.
Figure 2:
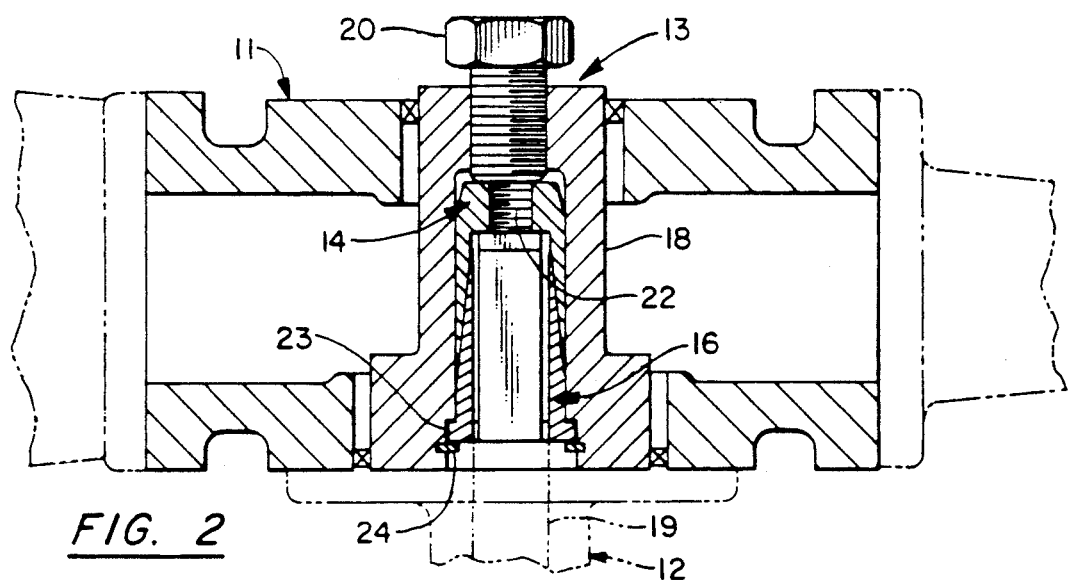
FIG. 2 is a fragmentary, partially sectional elevational view showing a portion of the apparatus of FIG. 1 in greater detail.
Figure 3:
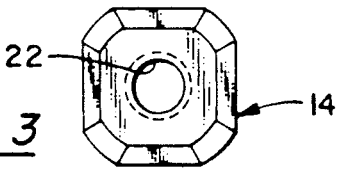
FIG. 3 is a plan view of a first sleeve which is part of the coupling.
Figure 5:
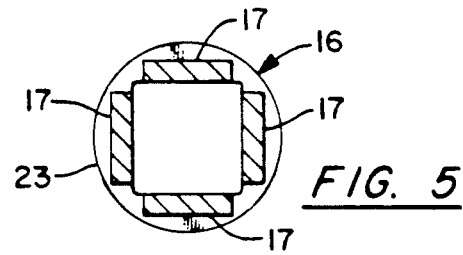
FIG. 5 is a sectional view taken along the line 5—5 of FIG. 6.
Figure 4:
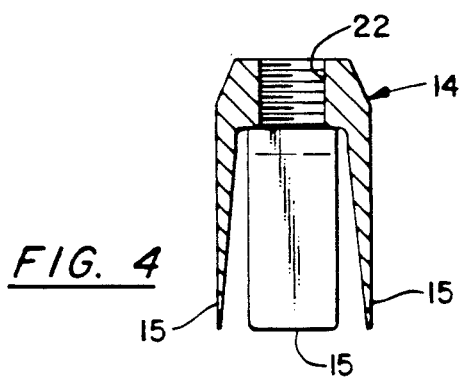
FIG. 4 is a sectional view taken along a vertical plane that bisects the first sleeve shown in FIG. 3.
Figure 6:
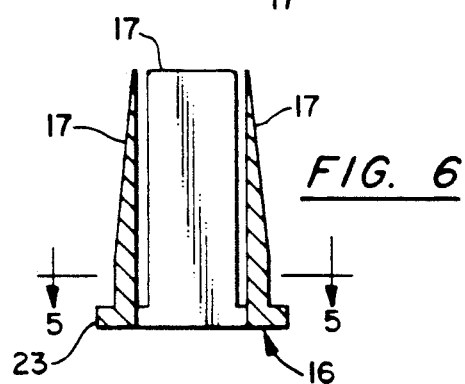
FIG. 6 is a sectional view taken along a vertical plane of a second sleeve.

The valve and actuator assembly 10 includes a actuator assembly 11, valve assembly 12, and a mechanical coupling assembly 13. The actuator assembly 11 illustrated is a pneumatic actuator although it will be understood that hydraulic or another actuators types in other forms of the invention. The actuator includes a rack 26 which is caused to move along a rectilinear path. The mechanical coupling assembly 13 includes a housing 18 that is free to rotate within the actuator assembly 11. The housing 18 includes a spur gear (not shown) that engages the rack 26 to cause rotation of the housing upon movement of the rack 26. (It will be understood that the rack 26 is shown in FIG. 1 and also in FIG. 8 as will be described hereafter. To simplify FIG. 2 and thus show other structure in more detail that is more related to the heart of the invention the rack has been omitted in FIG. 2. It will be understood that the location in FIG. 2 is behind coupling assembly 13 with the face parallel to the plane of the paper.) Thus, the force provided by the actuator assembly 11 is transferred to the mechanical coupling assembly 13.

The mechanical coupling assembly 13 engages a shaft 19, which in the illustrated embodiment has a square cross section, so that rotation of the housing 18 causes the shaft 19 to rotate. The utilization of a rack and spur gear is of course well known to those skilled in the art. In a typical butterfly valve the rotation of the shaft 19 a finite number of degrees will cause the butterfly (not shown) to rotate essentially the same number of degrees. This is not the case with all valves although it will be understood that the apparatus in accordance with the invention may be used with various other types of valves. For example, with a butterfly valve the spur gear does not need to extend completely around the housing 18. In other valves where additional travel is required the spur gear may even extend 360 degrees around the housing 18. It will be understood that the invention is not limited to actuators using a rack and pinion (or spur gear) drive. Other mechanical linkages are easily used with the coupling in accordance with the invention.

Disposed within a central bore having, in the preferred embodiment a square cross section in the housing 18 are a first sleeve 14 and a second sleeve 16.

The first sleeve 14 includes four wedge shaped members 15. All of the wedge shaped members 15 which are part of the first sleeve have two generally planar faces disposed in oblique relationship. The first sleeve 14 has a geometric axis. A normal line (not shown) from one planar face of each wedge shaped members 15 which is part of the first sleeve is disposed in perpendicular relationship to the axis.

Similarly, the second sleeve 16 includes wedge shaped members 17 which are part of the second sleeve. All of the wedge shaped members 17 which are part of the second sleeve have two generally planar faces disposed in oblique relationship. The second sleeve 16 has a geometric axis. A normal line (not shown) from one planar face of each wedge shaped members 17 which is part of the second sleeve is disposed in perpendicular relationship to the axis.

In the preferred embodiment wedge shaped members 15 which are part of the first sleeve are all the same size and all the small cross section tips are disposed in a common plane and all the large cross section axial extremities are also disposed in another common plane.

Similarly, in the preferred embodiment the wedge shaped members 17 which are part of the second sleeve 16 are all the same size and all the small cross section tips are disposed in a common plane and all the large cross section axial extremities are also disposed in another common plane.

Figure 7:
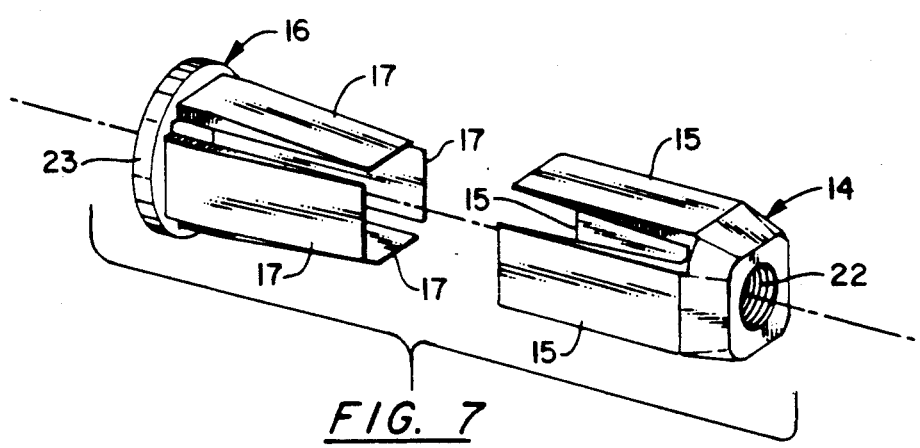
FIG. 7 is an exploded view showing in greater detail the manner of cooperation of the first and second sleeves.

As best seen in FIG. 7 the first sleeve 14 and second sleeve 16 are disposed in opposed relationship, thus progressively greater intermeshing of the first sleeve 14 and second sleeve 16 cause an increasing wedging action between the bore in the housing 18 and the square cross section shaft on the valve assembly 12.

The second sleeve 16 includes a base or flange 23 that is supported by a snap ring 24 within the housing 18. A bolt 20 engages the housing 18 and forces increasing overlap of the wedge shaped members 15 which are part of the first sleeve and wedge shaped members 17 which are part of the second sleeve. This results in wedging of the shaft of the valve assembly 12 in the bore of the housing 18. The wedging action is particularly effective to avoid any relative motion between the housing 18 and the shaft of the valve assembly 12.

If it is desired to disassemble the mechanical coupling assembly 13 the bolt 20 is removed and another bolt having a thread size corresponding to the threaded bore 22 is inserted in the threaded bore 22 which will force the first sleeve 14 and second sleeve 16 apart. More particularly, inserting a bolt having suitable threads in the hole 22 (in the sleeve 14) and turning that bolt causes that bolt to move axially and thus to push on the axial extremity of the sleeve 16 which has no opening in it. Thus, the sleeves 14, 16 are pushed apart. The manner in which this occurs is most evident by reference to FIG. 2.

Figure 8:
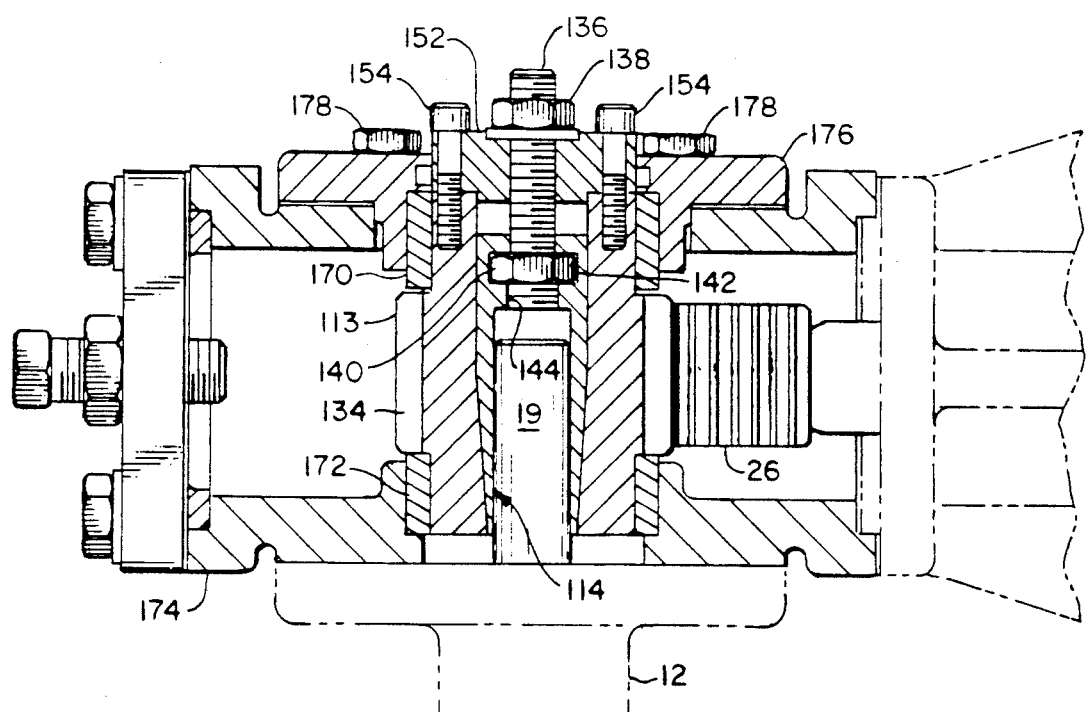
FIG. 8 is a fragmentary, partially sectional elevational view similar to FIG. 2 showing a second embodiment of the invention incorporating a one piece sleeve.
Figure 9:
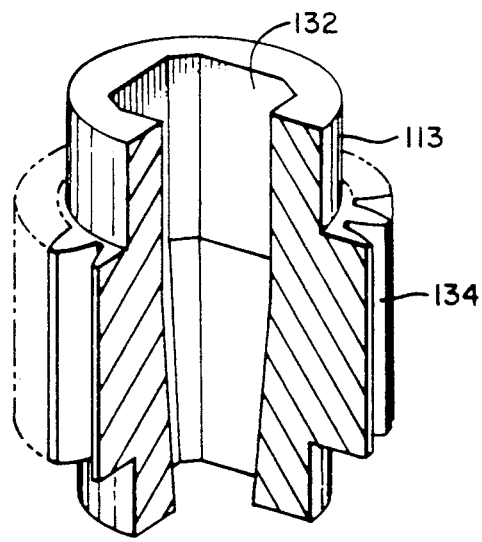
FIG. 9 is a perspective, broken away, partially sectional view illustrating the drive gear shown in FIG. 8 in greater detail.
Figure 10:
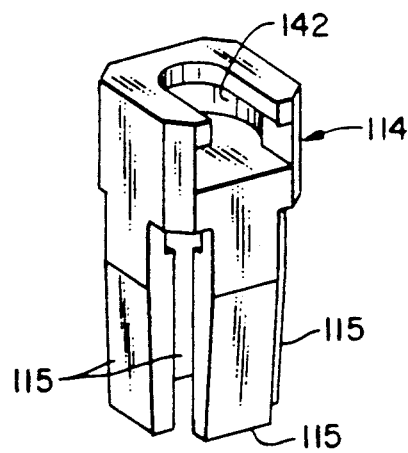
FIG. 10 is a perspective view of the sleeve with four wedge shaped legs or fingers that cooperate with the bore of the gear shown in FIG. 9 to grip the valve shaft or other shaft.

Referring now to FIGS. 8-10 there is shown a second embodiment of the invention incorporating a one piece sleeve 114 that cooperates with a drive gear 113. It will be understood that structure in this embodiment corresponding generally to the embodiment of FIGS. 1-7 has been assigned reference numerals which are 100 integers higher than the numbers in FIGS. 1-7. Thus, the gear 113 is generally equivalent to the mechanical coupling assembly 13. The drive gear 113 may be manufactured by means of powder metallurgy techniques in some forms of the invention. The sleeve 114 includes four wedge shaped legs 115.

A substantial advantage is achieved by minimizing the number of parts. More particularly, the gear 113 is provided with a tapered bore 132. The tapered bore 132 has four planar faces dimensioned and configured to engage the four planar faces of the sleeve 114. Stated another way, the sides of the bore are wedge shaped. As in the embodiment of FIGS. 1-7 the wedge shapes are disposed so that increasing the axial overlap of the bore 132 and the sleeve 114 causes an increased wedging action on the shaft both as a result of shape of the bore 132 and the sleeve 114. It will be seen that the tapered bore 132 means that it is not necessary to have two discreet sleeves 14, 16.

In this embodiment of the invention the greater the engagement of the sleeve 114 with the tapered bore 132 the tighter the engagement on a shaft 19. In other words movement of the sleeve 114 downward (as viewed in FIG. 8) within the bore 132 the tighter the engagement with the shaft 19. More particularly, the respective wedge shaped surfaces are disposed in opposed relationship so that each contributes to an increased wedging action with increasing axial overlap of the sleeve 114 and the bore 132.

The gear 113 includes teeth 134 that engage a rack 26 in the same manner shown in FIG. 1. A bolt 136 has threads that engage internal threads in a secondary plate 152 that is secured by bolts 154, 154 to the gear 113. The bolt 136 is provided with threads that engage a bore in the secondary plate 152. Typically, the upper (as viewed) axial extremity of the bolt 136 may have a hexagonal bore (not shown) machined in the upper (as view) tip for engagement with a wrench or may have opposed flat surfaces machined thereon so that a wrench (not shown) may be secured thereon to torque the bolt 136 causing the head 140 to push the sleeve downward and thus increase the engagement the sleeve 114 with the bore 132. The nut 138 serves merely as a jamb nut. This structure serves both as means to force engagement between the bore 132 and the sleeve 114 but also serves as a stop to prevent loosening of the connection once it has been made.

The gear 113 is carried for rotational movement by bearings 170, 172. The bearing 172 is carried by the housing 174 and the bearing 170 is carried by the primary plate 176. The primary plate 176 is secured to the housing 174 by bolts. It will thus be understood that the primary plate 176 does not move relative to the housing 174 and that the secondary plate 152 does move relative to the housing. More particularly, the secondary plate 152 rotates with the gear 113.

The head 140 of the bolt 136 is disposed in an open ended slot 142 in the sleeve 114. The sleeve 114 is disengaged from the bore 132 by rotating the bolt 136 in a direction opposite to that required to increase engagement as described above. The apparatus shown in FIGS. 8-9 is otherwise generally similar to the embodiment shown in FIGS. 1-7.

Figure 11:
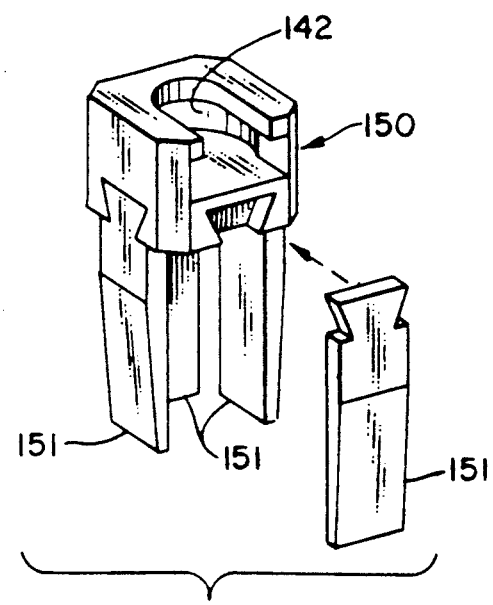
FIG. 11 is a perspective, exploded view of an alternative sleeve embodiment incorporating a sleeve that includes a central hub that includes a central hub to which four wedge shaped legs are dove-tailed.
Figure 12:
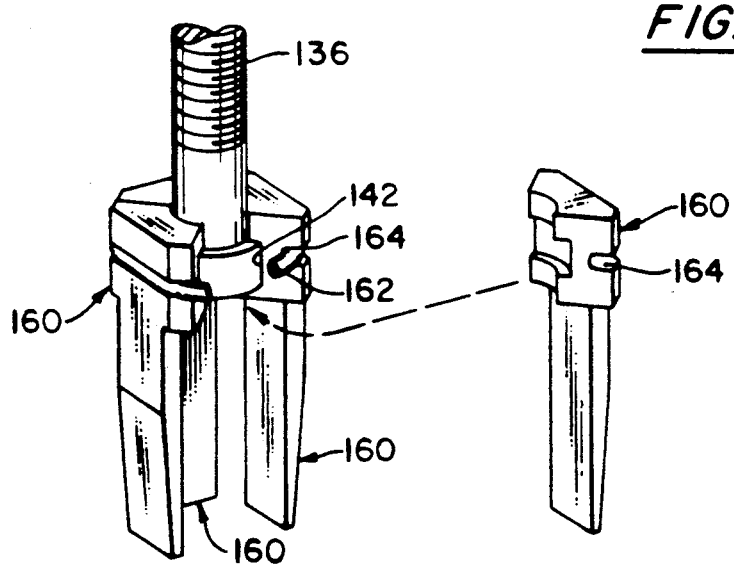
FIG. 12 is an another alternative sleeve embodiment in which 4 separate wedge shaped legs are secured to a central hub by a retaining means such as an O-ring.

The sleeve 114 is of one piece construction as indicated previously. The alternates shown respectively in FIG. 11 and FIG. 12 are somewhat easier to manufacture because the shape of the individual parts are less complex. In the embodiment of FIG. 11 the structure includes a central hub 150 to which four wedge shaped legs 151, 151, 151, 151 are dove-tailed. It will be seen that the wedge shaped members are identical and thus manufacturing is simplified.

In the embodiment of FIG. 12 four identical elements 160 having wedge shaped lower extremities and crescent shaped upper extremities that, in the preferred embodiment, occupy 90 degree sectors about the head of a bolt 136. More particularly, the elements 160. The elements 160 are secured by an O-ring 162 that engages a circumferential groove 164.

The embodiment of FIG. 10 will accommodate a plurality of different sizes of shafts 19 merely by substituting a different sleeves 114 having a different leg thicknesses. Similarly, the embodiment of FIGS. 11 will utilize a standardized central hub 150 to which legs 151 of legs of different sizes may be attached. In the embodiment of FIG. 12 different elements 160 may be utilized to achieve the desired result of enabling the use with a range of different size shafts 19. This permits, for example, the use of any one actuator with a range of valve shaft sizes and thus inherently a range of valve sizes.

For those applications where there is no need to have compatibility with a large range of valve shaft sizes it is possible to eliminate still more parts by making the valve shaft tapered and the bore on a driving member is also tapered. This will result in the least number of parts but will limit the range of possible size combinations.

It will be understood that the four wedge shaped surfaces in both the male and female elements in the preferred form of the invention are disposed so that for any cross section taken perpendicular to the geometric axis of that element has the faces of the wedge shaped surfaces coincident with at least a portion of each of the respective sides of a square.

It will be understood that while the invention has been described as a external polygon shaped cross section driven member and an internal polygon shaped drive member that either member may be the drive member or the driven member. It will also be understood that while the invention has been described as in terms of a square driven shaft cooperating with a square cross section bore and that other forms of the invention may use many other polygon cross sections. Some forms of the invention may even use polygons having a different number of sides on the drive and driven members. For example, and not by way of limitation an octagon cross section drive member may cooperate with a square cross section driven member. It will also be understood that the respective polygons need not be regular polygons, that is, all of the sides need not be of equal length.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described my invention I claim:

1. Apparatus for mechanical coupling which comprises:
   an elongated drive member having an axial extremity having a drive surface and an elongated driven member having an axial extremity having a drive surface, one of said drive surfaces being an internal drive surface which has a polygon shaped cross section and one of said drive surfaces being an external drive surface which has a polygon shaped cross section; a sleeve including at least a first wedge shaped surface having generally planar faces and first and second axial cross sections, said second axial cross section axial being thicker than said first axial cross section;
   said drive and driven members being disposed with said drive surfaces disposed in nested axially overlapping relationship with said first wedge shaped surface disposed radially intermediate said the respective drive surfaces; and means for urging said first wedge shaped surface of said first sleeve intermediate said drive surfaces of said drive and driven member.

2. The apparatus as described in claim 1 further including:
   a second sleeve including at least a first wedge shaped surface having generally planar faces and a thin cross section axial part and a thick cross section axial part, said respective first wedge shaped surfaces being disposed in overlapping relationship intermediate said drive surfaces; and
   means for urging said first wedge shaped surface of said second sleeve intermediate said drive surfaces of said drive and driven members.

3. The apparatus as described in claim 2 wherein:
   said first wedge shaped surfaces are disposed in opposed relationship so that movement of said wedge shaped surfaces to increase overlapping therebetween caused by said means for urging said first wedge shaped surface of said first sleeve and said means for urging said first wedge shaped surface of said second sleeve causes said wedge shaped surfaces to have progressively greater wedging action.

4. The apparatus as described in claim 3 wherein:
   said first and second sleeves include a plurality of wedge shaped surfaces each having generally planar faces and a thin cross section axial part and a thick cross section axial part, respective wedge shaped surfaces of said first and second sleeves being disposed in axially overlapping face to face relationship intermediate said drive surfaces; and
   means for urging all of said wedge shaped surfaces of said first and second sleeve members intermediate said drive surfaces of said drive and driven members.

5. The apparatus as described in claim 4 wherein:
   both of said sleeve members have the same number of wedge shaped members as the number of sides of said polygon shaped cross section said external drive surface.

6. The apparatus as described in claim 5 wherein:
   each of said sleeves has an axis and a perpendicular to one face of each one of said plurality of wedge shaped members is perpendicular to said axis.

7. The apparatus as described in claim 6 wherein:
   each of said sleeves includes four wedge shape members.

8. The apparatus as described in claim 7 wherein:
   said external drive surface has a square cross section.

9. The apparatus as described in claim 8 wherein:
   said means for urging comprises a bolt for urging said first and second sleeves into engagement.

10. The apparatus as described in claim 9 wherein:
    at least one of said sleeves includes a threaded bore for engagement with a bolt to force separation of said first and second sleeves.

11. Apparatus for coupling a valve and an actuator which comprises:
    an elongated actuator drive member having an axial extremity having a drive surface and an elongated valve driven member having an axial extremity having a drive surface, one of said drive surfaces being an internal drive surface which has a polygon shaped cross section and one of said drive surfaces being an external drive surface which has a polygon shaped cross section;
    a first sleeve including at least a first wedge shaped surface having generally planar faces and a thin cross section axial part and a thick cross section axial part;
    said drive and driven members being disposed with said drive surfaces disposed in nested axially overlapping relationship with said first wedge shaped surface disposed radially intermediate said the respective drive surfaces; and
    means for urging said first wedge shaped surface of said first sleeve intermediate said drive surfaces of said drive and driven member.

12. The apparatus as described in claim 11 further including:
    a second sleeve including at least a first wedge shaped surface having generally planar faces and a thin cross section axial part and a thick cross section axial part, said respective first wedge shaped surfaces being disposed in overlapping relationship intermediate said drive surfaces; and
    means for urging said first wedge shaped surface of said second sleeve intermediate said drive surfaces of said drive and driven members.

13. The apparatus as described in claim 12 wherein:
    wherein said first wedge shaped surfaces are disposed in opposed relationship so that movement of said wedge shaped surfaces to increase overlapping therebetween caused by said means for urging said first wedge shaped surface of said first sleeve and said means for urging said first wedge shaped surface of said second sleeve cause said wedge shaped surfaces to have progressively greater wedging action.

14. The apparatus as described in claim 13 wherein:
    said first and second sleeves include a plurality of wedge shaped surfaces each having generally planar faces and a thin cross section axial part and a thick cross section axial part, respective wedge shaped surfaces of said first and second sleeves being disposed in axially overlapping face to face relationship intermediate said drive surfaces; and
    means for urging all of said wedge shaped surfaces of said first and second sleeve members intermediate said drive surfaces of said drive and driven members.

15. The apparatus as described in claim 14 wherein:

both of said sleeve members have the same number of wedge shaped members as the number of sides of said polygon shaped cross section said external drive surface.

16. The apparatus as described in claim 15 wherein: each of said sleeves has an axis and a perpendicular to one face of each one of said plurality of wedge shaped members is perpendicular to said axis.

17. The apparatus as described in claim 16 wherein: each of said sleeves includes four wedge shape members.

18. The apparatus as described in claim 17 wherein: said external drive surface has a square cross section.

19. The apparatus as described in claim 18 wherein: said means for urging comprises a bolt for urging said first and second sleeves into engagement.

20. The apparatus as described in claim 19 wherein: at least one of said sleeves includes a threaded bore for engagement with a bolt to force separation of said first and second sleeves.

21. The apparatus as described in claim 20 wherein: said driven member is on said valve, said drive member is on said actuator.

22. The apparatus as described in claim 21 wherein: said actuator includes a rack cooperating with said drive member.

23. Apparatus for mechanical coupling which comprises:
an elongated drive member having an axial extremity having a drive surface and an elongated driven member having an axial extremity having a drive surface, one of said drive surfaces being an internal drive surface which has a polygon shaped cross section and one of said drive surfaces being an external drive surface which has a polygon shaped cross section;
a sleeve including at least a first wedge shaped surface having generally planar faces and first and second axial cross sections, said second axial cross section axial being thicker than first axial cross section; and
said drive and driven members being disposed with said drive surfaces disposed in nested axially overlapping relationship with said first wedge shaped surface disposed radially intermediate said the respective drive surfaces.

24. The apparatus as described in claim 23 wherein: said internal drive surface has at least one wedge shaped surface.

25. The apparatus as described in claim 24 wherein: said wedge shaped surfaces are disposed in opposed relationship so that each contributes to an increased wedging action with increasing axial overlap of said sleeve and said internal drive surface.

26. The apparatus as described in claim 25 wherein: said sleeve and said internal drive surface each include a plurality of wedge shaped surfaces.

27. The apparatus as described in claim 26 wherein: said sleeve and said internal drive surface each include four wedge shaped surfaces.

28. The apparatus as described in claim 27 wherein: said four wedge shaped surfaces in each element are disposed so that any cross section taken perpendicular to the geometric axis of that element has the faces of the wedge shaped surface coincident with at least part of the respective sides of a square.

29. The apparatus as described in claim 28 wherein said four wedge shaped surfaces of said sleeve are discrete members and said sleeve includes a central hub.

30. The apparatus as described in claim 29 further including:
means for attaching said discrete members to said central hub.

31. The apparatus as described in claim 30 wherein: said means for attaching includes a dovetail joint.

32. The apparatus as described in claim 31 wherein: said means includes an elastic circumferential member.

33. The apparatus as described in claim 32 wherein: said means includes said discrete members are dimensioned and configured to nest around a bolt head.

34. The apparatus as described in claim 33 wherein: said means includes a circumferential groove for receiving said elastic circumferential member.

35. The apparatus as described in claim 27 further including:
means for urging said wedge shaped surfaces of said sleeve intermediate said drive surfaces of said drive and driven member.

36. The apparatus as described in claim 23 wherein: said sleeve includes an open ended slot therein.

37. The apparatus as described in claim 1 wherein: said sleeve includes an open ended slot therein.

38. The apparatus as described in claim 11 wherein: said sleeve includes an open ended slot therein.

* * * * *